United States Patent
George et al.

(10) Patent No.: US 10,531,134 B2
(45) Date of Patent: Jan. 7, 2020

(54) DETERMINING A TIME BUDGET FOR TRANSCODING OF VIDEO

(71) Applicant: Akamai Technologies, Inc., Cambridge, MA (US)

(72) Inventors: Thomas George, San Diego, CA (US); Xi Xu, Fremont, CA (US); Kourosh Soroushian, San Diego, CA (US); Pankaj Chaudhari, Spring Valley, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 2 days.

(21) Appl. No.: 15/809,762

(22) Filed: Nov. 10, 2017

(65) Prior Publication Data

US 2019/0149859 A1 May 16, 2019

(51) Int. Cl.
*H04N 21/2343* (2011.01)
*H04N 21/24* (2011.01)
*H04N 21/2187* (2011.01)
*H04N 21/8547* (2011.01)

(52) U.S. Cl.
CPC . *H04N 21/234309* (2013.01); *H04N 21/2187* (2013.01); *H04N 21/2343* (2013.01); *H04N 21/23439* (2013.01); *H04N 21/234345* (2013.01); *H04N 21/2401* (2013.01); *H04N 21/8547* (2013.01)

(58) Field of Classification Search
CPC ... H04N 21/234309; H04N 21/234345; H04N 21/23439; H04N 21/2401; H04N 21/2187; H04N 21/8547
See application file for complete search history.

(56) References Cited

U.S. PATENT DOCUMENTS

| | | |
|---|---|---|
| 6,820,133 B1 | 11/2004 | Grove et al. |
| 6,870,883 B2 | 3/2005 | Iwata |
| 7,111,057 B1 | 9/2006 | Wein et al. |
| 7,240,100 B1 | 7/2007 | Wein et al. |
| 7,274,658 B2 | 9/2007 | Bornstein |
| 7,296,082 B2 | 11/2007 | Leighton et al. |
| 7,340,505 B2 | 3/2008 | Rose et al. |
| 7,376,716 B2 | 5/2008 | Dilley et al. |
| 7,472,178 B2 | 12/2008 | Lisiecki et al. |
| 7,660,296 B2 | 2/2010 | Fletcher et al. |
| 9,432,704 B2 | 8/2016 | Mutton et al. |
| 9,485,456 B2 | 11/2016 | Soroushian et al. |
| 9,747,251 B2 | 8/2017 | Rosenzweig et al. |
| 2004/0213345 A1 | 10/2004 | Holcomb et al. |

(Continued)

OTHER PUBLICATIONS

Aparicio-Pardo, et al., Transcoding Live Adaptive Video Streams at a Massive Scale in the Cloud, MMSys'15, Mar. 18-20, 2015, Portland, OR, USA. Downloaded on Sep. 25, 2017, 12 pages. Available at: http://perso.telecom-bretagne.eu/gwendalsimon/data/MMSysRegPapers-final22.pdf.

(Continued)

*Primary Examiner* — Yassin Alata

(57) ABSTRACT

This document describes systems, methods, and apparatus for determining a time budget for transcoding a video. By calculating and/or monitoring the time budget in accordance with the teachings hereof, a transcoder can assess the effect its transcode duration will have on a client buffer. As a result the transcoder may adjust its processing of the video. The teachings hereof are applicable, without limitation, to the transcoding of live video.

24 Claims, 7 Drawing Sheets

(56) References Cited

U.S. PATENT DOCUMENTS

| | | |
|---|---|---|
| 2005/0091696 A1 | 4/2005 | Wolfe et al. |
| 2006/0114989 A1 | 6/2006 | Panda et al. |
| 2008/0084927 A1 | 4/2008 | Rosenzweig et al. |
| 2011/0090953 A1 | 4/2011 | Melnyk et al. |
| 2011/0173345 A1 | 7/2011 | Knox et al. |
| 2012/0331089 A1 | 12/2012 | Vonog et al. |
| 2013/0114744 A1 | 5/2013 | Mutton et al. |
| 2013/0117418 A1 | 5/2013 | Mutton et al. |
| 2013/0343450 A1 | 12/2013 | Solka et al. |
| 2014/0247887 A1 | 9/2014 | Brueck et al. |
| 2014/0282766 A1 | 9/2014 | Good et al. |
| 2015/0189225 A1 | 7/2015 | Soroushian et al. |
| 2015/0244757 A1 | 8/2015 | He et al. |
| 2017/0078680 A1 | 3/2017 | Coward et al. |

OTHER PUBLICATIONS

Deneke, Tewodors et al., Video Transcoding time predication for proactive load balancing, Multimedia and Expo (ICME), IEEE paper abstract, from conference Jul. 14-18, 2014, added IEEE Xplore Sep. 2014, IEEE International Conference, 3 pages. Downloaded on Sep. 12, 2017.

Georgakarakos, G., Parallel and Scalable Video Decoding for Distributed Transcoding Applications, Thesis, University of Turku, downloaded Sep. 12, 2017, 78 pages. Available at: http://users.abo.fi/Sebastien.Lafond/theses/Thesis_Georgios_final.pdf.

Lin, et al., Parallelizing Video Transcoding with Load Balancing on Cloud Computing, 4 pages. Downloaded on Sep. 25, 2017. Available at: https://pdfs.semanticscholar.org/55fd/0900ef4de99c7e99f5fc9f647ae615d1d428.pdf.

Sambe, et al., High-Speed Distributed Video Transcoding for Multiple Rates and Formats, IEICE Trans. Info. & Syst., vol. E88-D, No. 8 Aug. 2005, 9 pages. Downloaded on Sep. 12, 2017. Available at http://allm.net/wp-content/uploads/2014/10/rd2012_01_2_ica3pp_paper.pdf.

Sambe, Y. et al., Distributed Video Transcoding and its Application to Grid Delivery, 2003 IEEE, pp. 98-102.

Sanson, Horacio et al., Scalable Distributed Architecture for Media Transcoding, ICA 3 PP 2012, Part I, LNCS 7439, pp. 288-302, Spinger-Verlag, 2012. Downloaded on Sep. 12, 2017, 15 pages and available at http://allm.net/wp-content/uploads/2014/10/rd2012_01_2_ica3pp_paper.pdf.

DETERMINING A TIME BUDGET FOR TRANSCODING OF VIDEO

BACKGROUND

Technical Field

This application relates generally to the transcoding of video and more particularly to techniques for determining a time budget for transcoding a given segment of video in a distributed transcoding system.

Brief Description of the Related Art

This document relates to the transcoding of video. The term 'video' is meant to include multimedia presentations that have images and audio. Online videos are typically packaged into a container file. A container file, also referred to as a package, functions as a wrapper and describes the data elements and metadata of various multimedia, so that a client application knows how to play it. Example container formats include FLV, Silverlight, MP4, PIFF, and MPEG-TS. A container typically wraps elemental data—the audio or video images, for example. The elemental data is usually encoded in a different format than the container. For example, the audio and video data may be encoded using appropriate codecs, which are algorithms that encode and compress that data. Example codecs include H.264, VP6, AAC, MP3, etc.

A given video stream may have a variety of characteristics stemming from how it was encoded, compressed, and packaged. Examples include the bitrate of encoding, formats, resolutions, and other settings. Several versions of a given stream may be necessary for technologies like adaptive bitrate streaming, in order to allow a client or a server to switch between streams to compensate for network congestion or other issues.

The term 'transcoding' is meant to refer generally to convert from a single source video (or portion thereof) to one or more different versions. Versions are also referred to here as 'renditions'. Transcoding is done in order to (for example) support the distribution of videos to a wide variety of devices and in a wide variety of network conditions. Transcoding a video may involve changing an encoding parameter or container format. Changing the container format is sometimes referred to as transmuxing or remultiplexing). Transcoding may involve creating a version with a different bit rate, which is often referred to as transrating. In general, transcoding enables the creation of multiple copies of a given movie title at different screen sizes, bit rates, and client player formats.

While transcoding can be performed using a single computer, it is known in the art to transcode using a distributed or parallel approach. Typically, in a distributed approach, a source video file is broken into multiple segments or chunks, each of which processed as independent tasks independently. The segments are usually processed by different computers in a distributed architecture, enhancing scale and resilience and performance. A given transcoding machine is often tasked with creating all desired (N) versions of the original segment that it receives. It can then output the result(s) to a client, content distribution network, network storage, or other destination.

More information on transcoding in general and distributed transcoding can be found in U.S. Patent Publication No. 2013-0117418, titled "Hybrid Platform For Content Delivery and Transcoding", the teachings of which are hereby incorporated by reference in their entirety. That publication discloses a system in which computers in a content delivery network (CDN) are configured to perform transcoding in parallel. The CDN described there is a distributing computing system and has many computers referred to as CDN machines. The CDN machines are designated as transcoding resources (sometimes referred to herein as transcoders for convenience), a given content file is broken into segments (sometimes referred to as 'streamlets') which are distributed to various computers to be transcoded independently, along with instructions and parameters for the the desired transcode to be performed. Once the transcoders return the transcoded content, the segments can be reassembled to create the complete transcoded content file. U.S. Patent Publication No. 2013-0114744, titled "Segmented Parallel Encoding With Frame-Aware, Variable-Size Chunking," the teachings of which are hereby incorporated by reference in their entireties, discloses techniques for breaking a given video into segments. U.S. Pat. No. 9,485,456 "Frame Rate Conversion in a Distributed Computing System" and U.S. application Ser. No. 15/449,658, titled "Maintaining Stream Continuity Counter in a Stateless Multiplexing System" also describe transcoding technologies and are hereby incorporated by reference in their entireties.

In a video transcoding and delivery system, it is important for a given transcoder to know how long it has to create the target version(s) of a video segment from the source video segment. This is particularly important in live streaming (e.g., for live events), where the transcoding work must be done on the fly. Delays in sending the transcoded version(s) to a live video distribution network may cause viewer's streams to freeze, fail, or otherwise perform poorly.

The teachings hereof address the above technical problem by presenting systems, methods, and apparatus for a transcoder to calculate a time budget for a transcoding task that it has been assigned. Upon calculating the time budget the transcoder can take action to try to meet the time budget or mitigate an over-budget situation. Actions may include changing the priority of the transcode task, modifying the task to meet the budget, and other actions as described herein. The teachings hereof provide other benefits and improvements which will be described herein or apparent to those skilled in the art from review of this document.

SUMMARY

This document describes systems, methods, and apparatus for determining a time budget for transcoding a video. By calculating and/or monitoring the time budget in accordance with the teachings hereof, a transcoder can assess the effect its transcode duration will have on a client buffer. As a result the transcoder may adjust its processing of the video. The teachings hereof are applicable, without limitation, to the transcoding of live video. As those skilled in the art will recognize, the foregoing description merely refers to examples of the invention. There are many variations of the inventive teachings described herein. The claims alone define the scope of the invention for which protection is sought.

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the system, methods and apparatus disclosed herein. The systems, methods and apparatus described in this application and illustrated in the accompanying drawings are non-limiting examples; the claims alone define the scope of protection that is sought. The features described or illustrated in connection with one embodiment may be combined with the features of other embodiments. Such modifications and variations are intended to be included within the scope of the present invention. All patents, patent application publications, other publications, and references cited anywhere in this document are expressly incorporated herein by reference in their entirety and for all purposes. The term "e.g.," used throughout is used as an abbreviation for the non-limiting phrase "for example."

Basic familiarity with well-known web, streaming, and networking technologies and terms, such as HTML, URL, XML, AJAX, CSS, MPEG, ABR, HTTP versions 1.1 and 2, TCP/IP, and UDP, is assumed. The term "server" is used herein to refer to hardware (a computer configured as a server, also referred to as a "server machine") with server software running on such hardware (e.g., a web server). Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The teachings hereof will be described primarily in the context of live video. However, as those skilled in the art will understand, they are also applicable to other forms of video, such as video on demand platforms.

Figure 1:
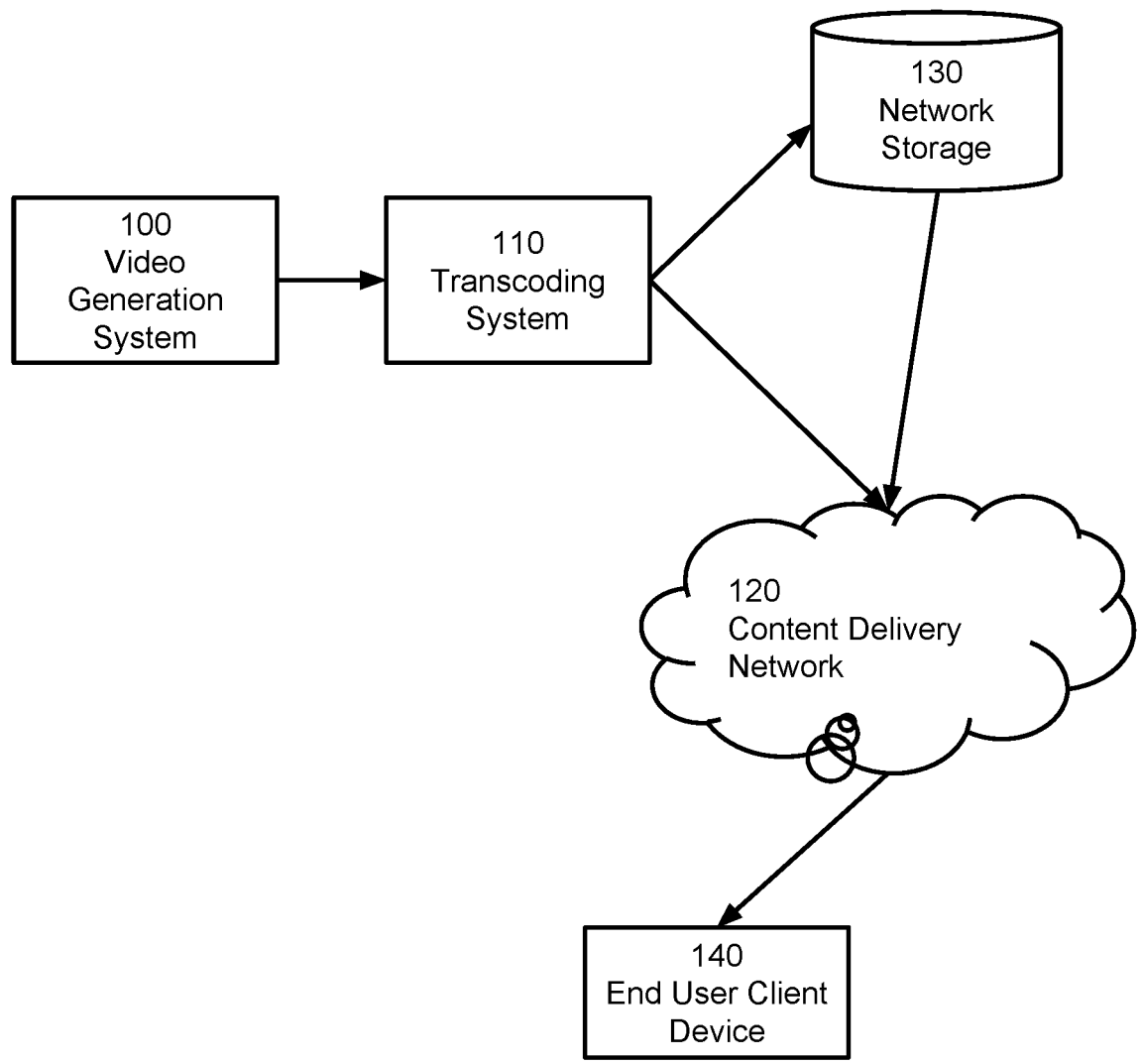
FIG. 1 is a block diagram illustrating an embodiment of an online video transcoding and distribution system.

FIG. 1 provides a system overview of a preferred embodiment. Video generation system 100 represents a live video capture and encoding system. Video generation system 100 is typically composed of a set of components that capture a live event, e.g., a soccer match, and produce an output video stream in a known format, e.g., a fragmented MP4 or MPEG-TS container packaging compressed audio and video. The time budget calculations described below are agnostic to the particular configuration of system 100, except that in one embodiment, the video generation system 100 may be modified to generate and add timestamps to its output stream before transmitting it to the transcoding system 110, as will described in more detail below.

The video generation system 100 transmits the live video stream to a transcoding system 110, e.g., via a secure channel over the Internet. Some or all of the channel between the video generation system 100 and transcoding system 110 may be a satellite link. The transcoding system 110 may be made up of many different computers in many different cloud data centers; the video is preferably ingested into the closest one to the video generation system 100. In general, the transcoding system may be architected as described in U.S. Patent Publication No. 2013-0117418, titled "Hybrid Platform For Content Delivery and Transcoding". The transcoding system 110 may be implemented with or without the content delivery platform mentioned in that document.

After transcoding, the transcoded video streams are transmitted to a content delivery network (CDN) 120 for delivery to end user client devices 140, and/or to a network storage 130 from which CDN servers can retrieve the video, or for archival, trick play functionality, or the like. End user client devices 140 in this context means a client device (e.g., laptop, smartphone, tablet) running a client player application, which may be dedicated player, e.g., or a plugin or player embedded in a browser (such as HTML5 player, Flash plugin), or otherwise.

Figure 2:
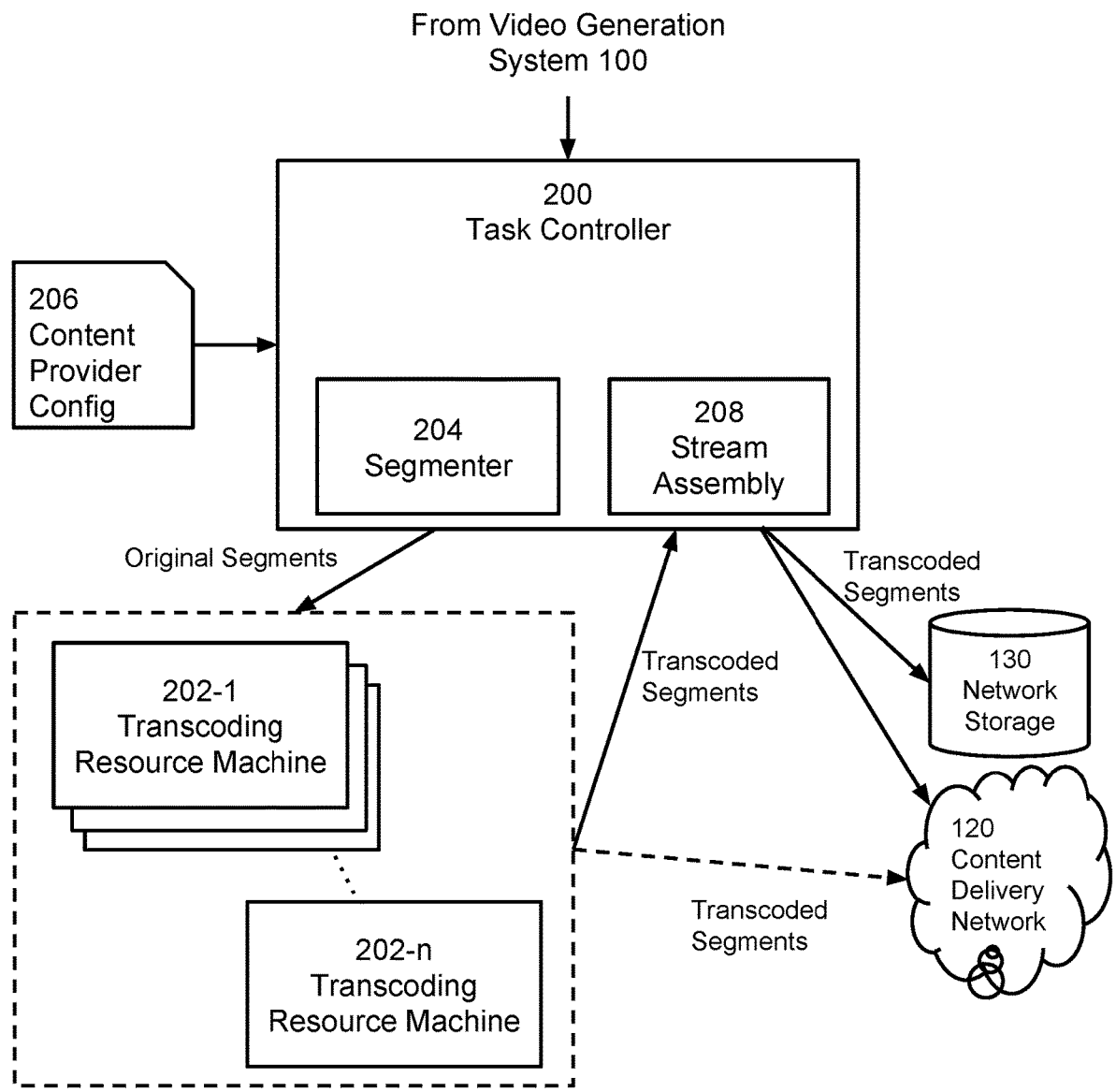
FIG. 2 is a block diagram illustrating an embodiment of the transcoding system shown in FIG. 1.

FIG. 2 is a high-level diagram of an embodiment of the transcoding system 110 shown in FIG. 1. Many different implementations are possible, but in one embodiment, the transcoding system 110 can include a task controller 200 and a set of distributed transcoding resource machines 202-1 through 202-n. A transcoding resource machine is referred to herein as a 'transcoder' and the label '202' is used to refer to any transcoder selected from the set 202-1 to 202-n. The transcoders may be distributed across a number of data centers (also referred to as points of presence) around the Internet. The task controller 200 preferably has a segmenter component 204 that breaks the video stream into segments as it arrives from the generation system 100, if necessary. A suitable process for breaking the stream into segments is described in U.S. Patent Publication No. 2013-0114744, the teachings of which are hereby incorporated by reference. Note that a live video stream typically does not need to be broken into segments and so the segmenter 204 may not be necessary for that purpose; the generation system 100 will generate and send the stream in segments. However, the segmenter 204 may still be necessary, for example, if segments need to be augmented with information from neighboring segments (e.g., I-frames from a prior segment or a following segment) before being sent to a selected transcoder.

The task controller 200 accepts a content provider configuration 206 (typically from the video provider whose video is being live-streamed, received through a web portal for example). The configuration 206 defines the desired set of target versions, or renditions, that the live transcoding system is to create for the given video. A configuration may specify for each target version a container format, compression level, resolution, and so on.

The task controller 200 assigns a given segment of the video stream to a transcoder, preferably selecting the transcoder in accord with various load balancing and priority algorithms, the specific implementations of which are not significant to the teachings hereof. The task controller 200 creates a set of task instructions that describe the versions that are to be created, consistent with the content provider's configuration 206.

The task controller 200 sends the video segment (augmented with information from other segments if needed) and the task instructions to the selected transcoder. The transcoder decodes the video segment, decompresses the elemental audio and/or video, and creates all necessary version(s) therefrom. Hence, from a single source segment, the transcoder may create any number N of segment versions.

Once the transcoder is finished with the transcode, it can send the versions back to the task controller 200. The task controller 200 can include a segment assembly component 208 that assembles the transcoded segments into the full-length videos and/or ensures the segments are in the proper storage location for the CDN 120 to retrieve. Alternatively, the component 208 could actively push the transcoded segments to an ingest point of the CDN 120 (e.g., to a particular CDN server 302 as is described in connection with FIG. 3 below).

Alternatively, the assigned transcoder could simply send the finished segments directly to an output location specified in the transcoding task. The output location would be network storage 130 or a particular server (e.g., specified by IP or hostname) in the CDN 120 in FIG. 2. This is illustrated by the dotted line from the transcoders to the the CDN 120 in FIG. 2.

Network storage 130 may be implemented as described in U.S. Pat. Nos. 7,340,505 and 7,472,178, the teachings of which are hereby incorporated by reference in their entireties. However, the teachings hereof are agnostic to the particular implementation.

Figure 3:
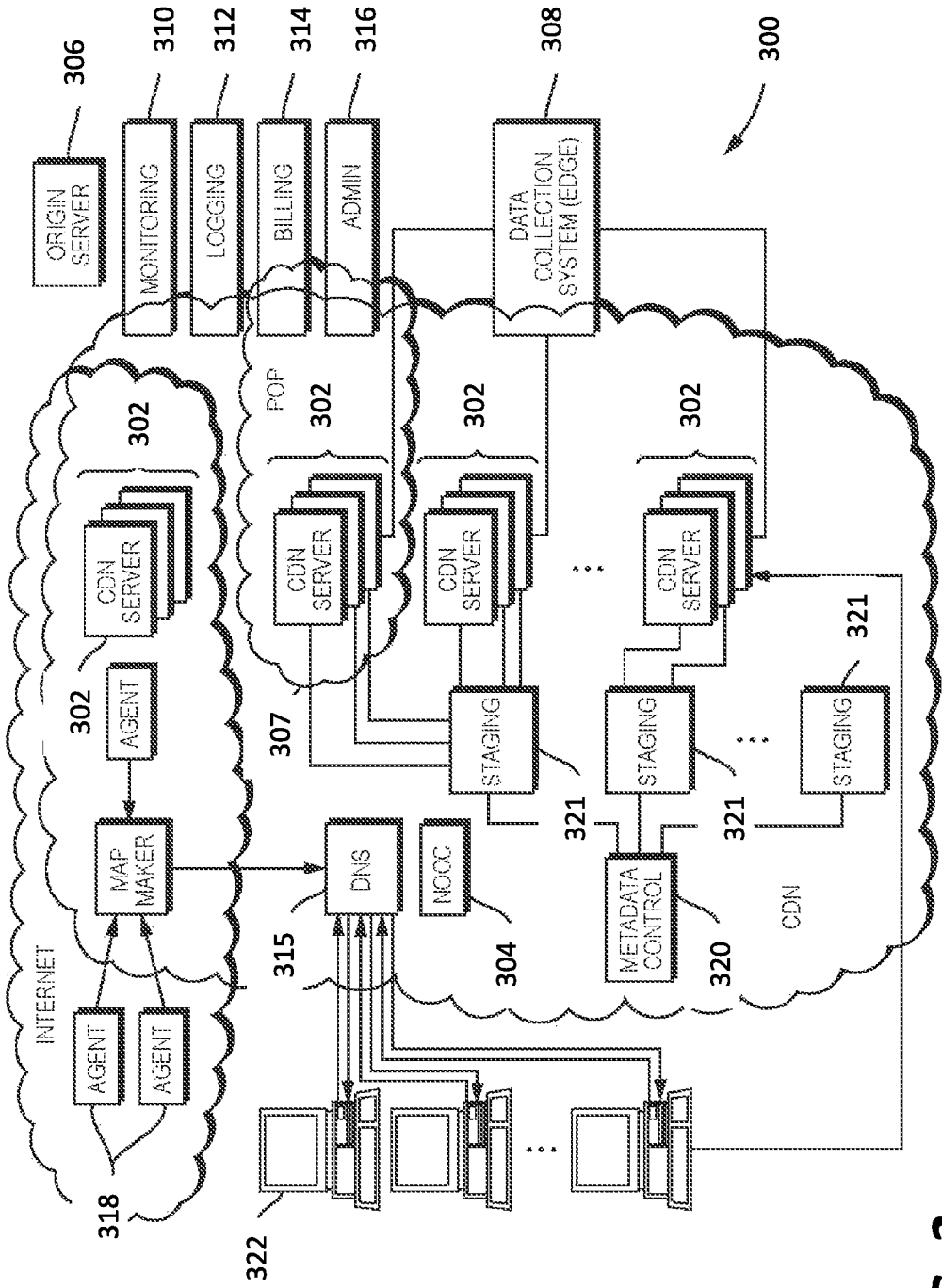
FIG. 3 is a block diagram illustrating an embodiment of the content delivery network shown in FIG. 1.

FIG. 3 is a diagram of an embodiment of the CDN 120 shown in FIG. 1. CDNs are generally known in the art. A "content delivery network" or "CDN" is often operated and managed by a service provider. The service provider typically provides the content delivery service on behalf of third parties. A distributed system of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, e.g., the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN's components may be located at nodes that are publicly-routable on the Internet, within or adjacent nodes that are located in mobile networks, in or adjacent enterprise-based private networks, or in any combination thereof.

In a known system such as that shown in FIG. 3, a distributed computer system 300 is configured as a content delivery network (CDN) and has a set of computer machines 302 distributed around the Internet. Typically, most of the machines are configured as servers and located near the edge of the Internet, i.e., at or adjacent end user access networks. A network operations command center (NOCC) 304 may be used to administer and manage operations of the various machines in the system. Third party sites affiliated with content providers, such as web site 106, offload delivery of content (e.g., HTML or other markup language files, embedded page objects, streaming media, software downloads, and the like) to the distributed computer system 300 and, in particular, to the servers (which are sometimes referred to as content servers, or sometimes as "edge" servers in light of the possibility that they are near an 'edge' of the Internet). Such servers may be grouped together into a point of presence (POP) 307.

Typically, content providers offload their content delivery by aliasing (e.g., by a DNS CNAME) given content provider domains or sub-domains to domains that are managed by the service provider's authoritative domain name service. End user client devices 322 that desire such content may be directed to the distributed computer system to obtain that content more reliably and efficiently. The CDN servers 302 respond to the client device requests, for example by obtaining requested content from a local cache, from another CDN server 302, from the content provider origin server 306, or other source. The video generation system 100 in FIG. 1 is an example of an origin 306.

Although not shown in detail in FIG. 3, the distributed computer system may also include other infrastructure, such as a distributed data collection system 308 that collects usage and other data from the CDN servers, aggregates that data across a region or set of regions, and passes that data to other back-end systems 310, 312, 314 and 316 to facilitate monitoring, logging, alerts, billing, management and other operational and administrative functions. Distributed network agents 318 monitor the network as well as the server loads and provide network, traffic and load data to a DNS query handling mechanism 315, which is authoritative for content domains being managed by the CDN, and which acts as a request routing mechanism to direct clients to a selected CDN server 302. A distributed data transport mechanism 320 may be used to distribute control information (sometimes referred to as "metadata") to the CDN servers.

A given CDN server 302 in the CDN comprises commodity hardware (e.g., a microprocessor) running an operating system kernel (such as Linux® or variant) that supports one or more applications. To facilitate content delivery services, for example, given servers typically run a set of applications, such as an HTTP (web) proxy server, a name service, a local monitoring process, a distributed data collection process, and the like. The HTTP proxy server (sometimes referred to herein as a HTTP proxy for short) is a kind of web server and it typically includes a manager process for managing a local cache and delivery of content from the machine (including HTTP-based streaming). For streaming media, the machine may include one or more media servers, as required by the supported media formats.

A CDN server 302 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (again sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

Preferably, the CDN operates a DNS infrastructure to route client requests (i.e., request routing service) to a selected CDN server 302. In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname the CDN, and that hostname is then resolved through the CDN name service. To that end, the CDN domain name service returns one or more IP addresses (via consultation with the mapmaker shown in FIG. 3). The requesting client application (e.g., a web browser) then makes a content request (e.g., via HTTP or HTTPS) to a CDN server 302 associated with the IP address. The request includes a host header that includes the original content provider domain or sub-domain. Upon receipt of the request with the host header, the CDN server 302 checks its configuration file to determine whether the content domain or sub-domain requested is actually being handled by the CDN. If so, the CDN server 102 applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server 302 should use when processing that request.

A CDN may have a variety of other features and adjunct components. For example the CDN may include a network storage subsystem (sometimes referred to as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content, one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, as well as a transcoding system as described in U.S. Pat. No. 9,432,704, the disclosures of which are incorporated herein by reference.

The details of a transcoder 202 determining and using a time budget while performing a transcoding task will now be described.

Assume that a video arrives into the transcoding system 110 in segments and that the segments are processed synchronously, i.e., a delay processing a particular segment adds to the delay for succeeding segments by that delay amount.

As is known the art, client player applications typically buffer the incoming video stream. The initial client buffer depth is the duration of video in the player's buffer when it begins playing the video for the first time. Let $CB_{init}$ be the initial client-buffer depth. For example, an HTTP live streaming (HLS) client player programmed to have an initial client buffer depth of 3*[segment-duration] would begin initial playout on receiving the 3rd segment, assuming all segments are approximately the same duration.

For the sake of analysis and explanation, and without loss of generality, assume when the client player begins initial playout, the video generation system 100 has just generated a segment. The client-buffer depth varies as video bits are removed on playout and replenished as new segments arrive. Let $CB_{now}$ be the client-buffer depth, as estimated, at the current time. If $CB_{now}$ goes to zero, then the client playout stalls.

Let $T_{Vi}$ be the playout duration for the current, say ith, video segment $V_i$. The time required for the client to download and decode an initial frame of video segment $V_i$ is estimated to be proportional to the playout duration of $V_i$. This time will vary in accord with the last-mile conditions, the GoP structure of the segment (i.e., whether the segment begins with a I-frame, or a B-frame or P-frame) and client device capabilities, so it is treated as an estimate. Let this estimate be $\lambda T_{Vi}$. Thus, the overall time budget in units of duration for transcoding and distributing $V_i$ to through the CDN 120 to the client, including the decode time at the client, is:

$$\text{time budget} = CB_{now} - \lambda T_{Vi} \quad \text{[Equation 1]}$$

A preferred solution involves adding a timestamp, representing the clock time, to each video segment when it is generated by system 100, or when it enters the transcoding system 110. As such, the timestamp can be added by a component in the system 100 or upon receipt by the transcoding system 110. Let $TS_{Vi}$ be that timestamp. A suitable header field in which to add and carry the timestamp is the HTTP header field in an HTTP message. For example, it could be in an X-header in an HTTP POST message used to send the video segment to the next component in the system, or in an HTTP POST message used to send a reference to the next segment (i.e., a message saying, in effect, please transcode the segment located at this particular URL.).

Let $TS_{now}$ be the clock time on starting the transcoding of $V_i$.

If $TS_{now} = TS_{Vi}$ then the transcoding system is ready to process the video segment as soon as it is available, implying it is keeping up with real-time generation of video segments. If $TS_{now} = TS_{Vi}$ then it also means (due to the assumptions above) that the client has just started a new segment and thus its client-buffer depth is $CB_{init}$.

If $TS_{now} > TS_{Vi}$ then the transcoding system encountered a previous delay and is behind real-time processing by $(TS_{now} - TS_{Vi})$ and the client-buffer depth is similarly reduced. Thus, we have:

$$CB_{now} = CB_{init} - (TS_{now} - TS_{Vi}) \quad \text{[Equation 2]}$$

Restating Equation 1 and Equation 2, we have the overall time budget for completing a transcode task and distributing via CDN to the client as:

$$\text{time budget} = CB_{now} - \lambda T_{Vi} \quad \text{[Equation 1]}$$

$$\text{where } CB_{now} = CB_{init} - (TS_{now} - TS_{Vi}) \quad \text{[Equation 2]}$$

An expanded and equivalent form of Equation 1 is simply:

$$\text{time budget} = CB_{init} - (TS_{now} - TS_{Vi}) - \lambda T_{Vi} \quad \text{[Equation 3]}$$

As those skilled in the art will readily understand, in all places where Equations 1 and 2 are mentioned in this document, Equation 3 can be used, and vice versa.

The time budget shown above is the time until the client's buffer will be exhausted and playback interrupted.

A transcoder can calculate the values used in the above equations as follows:

$CB_{init}$: This value is system configured and can be specific to video container type and a target segment duration, both of which are known on startup. This means that the transcoder can examine the video container type and target segment duration for a particular transcode task, and determine the appropriate buffer value to use based on e.g., a lookup table, on a task by task basis. Also, the buffer value could be specific to a client player, in which case, different streams are generated for the different clients and served appropriately. In this latter case, video streams are associated with a target client player (or group thereof) and the buffer value sized appropriately.

$CB_{now}$: Derived in [Equation 2].

$T_{Vi}$: This value is obtained from the incoming video segment or accompanying manifest, e.g., a custom HTTP header field, for example an X-ORIGIN-TIME-STAMP header field. It does not require decoding the video.

$\lambda T_{Vi}$: $\lambda$ is a system wide constant. More generally, $\lambda TVi$ could be replaced by a predefined system-wide function of the video segment Vi characteristics like segment size in bits.

$TS_{now}$: The current clock time is obtained from the system clock of the transcoder. This clock is in synchrony with the clock that generates the $TS_{Vi}$ timestamp.

$TS_{Vi}$: This timestamp is generated by the video generation system 100 or the front-end of the transcoding system 110 (e.g., a receive buffer in the task controller 200 application, a network interface card in the computer hosting the task controller application 200, or other process or component). This timestamp denotes the time at which the ith video segment was generated when generated by the video generation system 100. When generated by the front-end of the transcoding system 110, it is an approximation thereof. The clock used for this timestamp is synchronized with the clock calculating $TS_{now}$ using a protocol like Network-Time-Protocol (NTP).

A transcoder 202 that is assigned a transcoding task may use the above equations to calculate a time budget in a variety of ways. It should be noted that the above equations are part of a model for estimating a time budget, and hence the model and estimation may be used in a variety of ways.

For example, one approach is for the transcoder to calculate the overall time budget per Equations 1 and 2 and then take steps to ensure that the transcoding task is complete before the overall budget runs out. This means, however, that the client buffer could be drained by that transcoding task. Thus, this approach can be viewed as establishing a maximum time that the transcoder should not go beyond.

Another approach is for the transcoder to try to complete the transcode such that the client's buffer initial buffer is not reduced as a result of this particular segment and task. This means that the value of $CB_{init}$ in Equations 1 and 2 should be treated as equal to the duration of the current video segment (i.e., the segment being transcoded). If that occurs, then the drain on the buffer (in terms of video duration) will be equal to the replenishment by the current segment. With this, and using the form of Equation 3, the time budget becomes:

$$\text{time budget} = T_{Vi} - (TS_{now} - TS_{Vi}) - \lambda T_{Vi} \qquad \text{[Equation 4]}$$

This means that the transcoder should complete the task within the time period defined by the duration of the current segment reduced by the time stamp difference (how far the system is behind real-time processing) and further reduced by the time required for the client to download and begin decoding ith video segment $V_i$.

The two approaches above can be thought of as the maximum transcode time [Equations 1 and 2, or Equation 3] and the target transcode time [Equation 4].

Once a transcoder 202 calculates a maximum and/or target transcode time, then it may estimate the time it will take to complete the transcode. The estimate can be calculated in a variety of ways. For example, the transcoder can track its historical performance for segments characterized across one or more dimensions (size, codec, task type). Given a segment, the transcoder can look at how long it took to complete a similar task with similar dimensions, in the past. Another approach could be to develop a formula that estimates transcode time as a function of some aspect of the video-segment. For example, the estimate could be the duration of the video segment multiplied by a scaling factor, which may be empirically derived.

The transcoder may then realize that the time budget is too small, in light of the estimate of transcoding time. If so, then the transcoder can take any of a variety of actions to reduce transcoding time and stay within budget (or at least as close to budget as possible). The content provider may dictate the actions to take using the content provider configuration 206. Different actions may be taken depending on whether the transcoder estimates that it cannot meet the target transcoding budget (less severe mitigation) or maximum transcoding budget (more severe actions).

For example, the transcoder 202 may adjust the priority of the transcode task relative to other transcoding or housekeeping tasks that are running on the transcoder at the time (e.g., reporting status, generating logs).

As another example, the transcoder 202 can adjust the number of versions of the video segment that it creates. For example, the instructions of the transcoding task may specify that five different version are to be created from the original segment. However, due to the time budget, the transcoder may not create some of these. For example it may generate only three versions and omit the rest. Preferably, the instructions for the transcoding task include a priority ranking of the versions, informed by configuration 206, so that the highest priority versions are most likely to be completed and the lower priority versions the ones that are likely to be dropped.

Dropping one or more versions of a transcode task can be advantageous for keeping the transcode system on budget, but it has the downside that the system may no longer be producing a variant that is optimal for a particular client player or class of players. In a worst case scenario, the transcoder might drop all versions, leaving no variants for the client players. One way to address this issue is to provide support in the system for mezzanine fallback. Mezzanine fallback is described in more detail later in this document.

Another mitigation approach is for the transcoder 202 to calculate a maximum and/or target transcode time and monitor the progress of the task processing. For example, the transcoder can check after each version is created to see if the budget has been exceeded—or whether it would be in light of an estimated time to complete the next version. When the budget is exhausted, the transcoder can begin to take ameliorative action, e.g., by raising the priority of the transcode task or dropping versions by ending transcoding early even if it has not yet generated all desired version of the segment. For example, the task may entail creating five versions of a segment, but if the budget has elapsed after generation of version four, the fifth is omitted and the four existing segments sent back to the task controller 200.

Yet another mitigation approach is for the transcoder 202 to send a message upstream to request the next part of the transcode task be divided amongst two or more other transcoders.

Yet another mitigation approach is for the transcoder to temporarily suspend certain other processing, in particular, the upload process. This means that the transcoder will wait to upload finished segments until it is done with all segments, to conserve processing cycles. However, it may be advantageous to upload at least one segment before halting upload, so that a client has something to access right away.

Figure 4A:
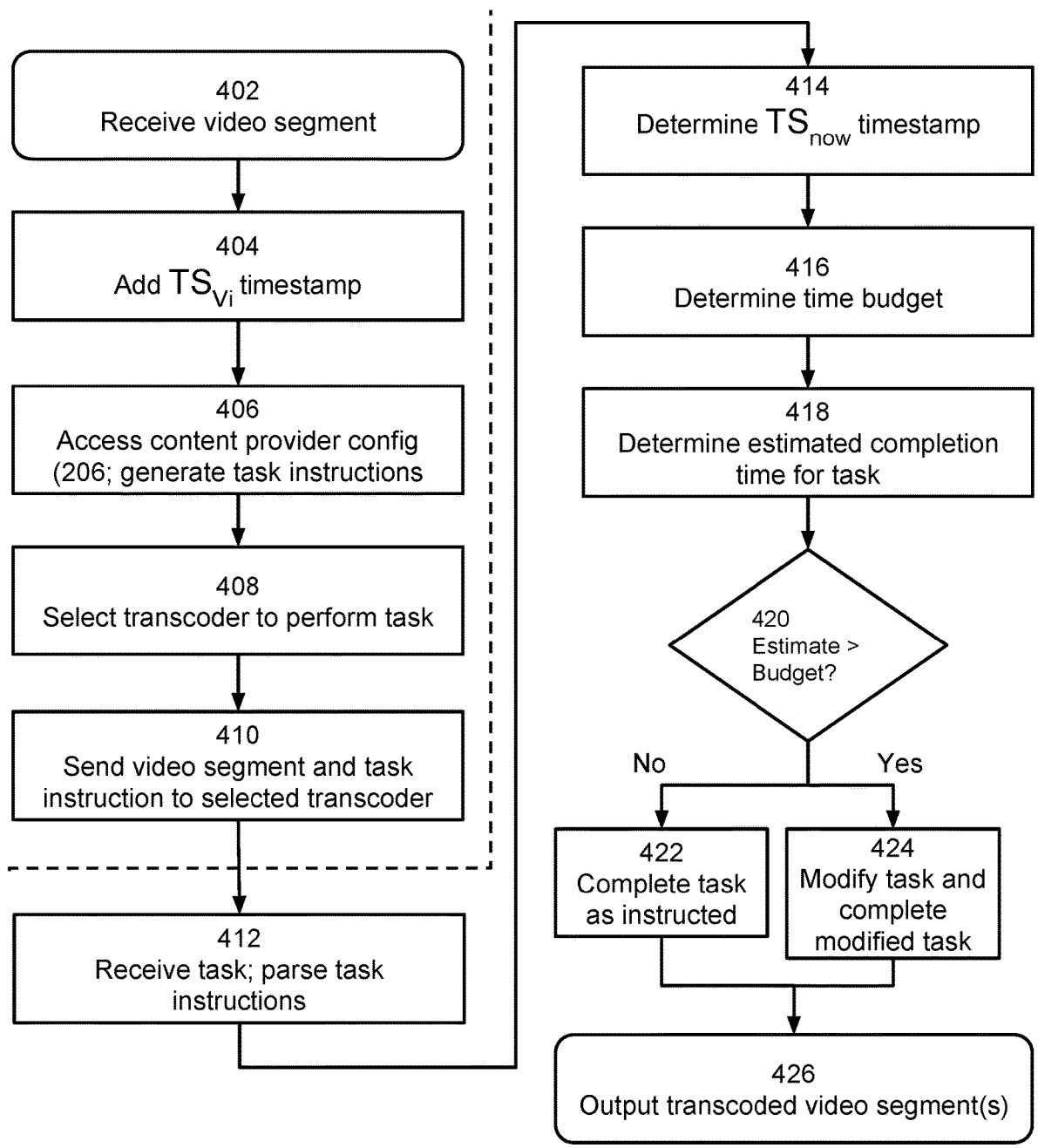
FIG. 4A is a flow diagram illustrating processing steps performed by the transcoding system shown in FIG. 1, according to an embodiment.

FIG. 4A is a logical flow diagram for calculating and utilizing a time budget for a transcoder to complete a transcoding task, in one embodiment. Given the example implementation shown in FIG. 2, FIG. 4A shows the task controller's steps and the selected transcoder's steps, with the dotted line between them to divide the sequence. Steps 402-410 are performed by the task controller 200; steps 412-424 are performed by the transcoder 202.

At step 402, a video segment is received from the video generation system 100.

At step 404, a time stamp is added. This is the time stamp $TS_{Vi}$. Preferably, the timestamp is in accord with NTP format and programmatically associated with the video segment when the segment is being handled within the system. The timestamp is added to the communication header, e.g., of the application layer such as an X-header in an HTTP message, when sending across a network to the next system. (Alternatively, the video generation system 100 could add the timestamp, meaning that it would be already in the communication header of the received video segment.)

At step 406, the task controller identifies the content provider for the video (e.g., based on the computer sent it or a signature, etc.) and accesses a configuration file for that content provider and video. The task controller generates a set of task instructions that define the number and characteristics of each version of the video segment that should be created by the transcoding system (e.g., bitrate/compression level, format, frame rate, resolution, aspect ratio, etc.). The instructions may also include a location where the completed versions should be sent, file naming conventions, priority level, billing information, and the like.

At step 408, the task controller selects a particular transcoder, preferably according to a load balancing algorithm (e.g., round robin, based on current load, location, or other factors; the particular implementation is not crucial to the teaching hereof).

At step 410, the task controller sends the video segment and the task instructions to the selected transcoder.

At step 412, the transcoder receives the video segments and task instructions, and it parses the instructions. The transcoder may need to wait for other local processes (transcoding tasks or otherwise) to complete before initiating this transcode.

At the time that the transcoder is ready to begin the transcode, it determines the current time based on its system clock; the current clock time is $TS_{now}$. Preferably the transcoder's clock has been synchronized with the component that was responsible for inserting the $TS_{Vi}$ timestamp. (Step 414)

In step 416, the transcoder uses $TS_{now}$, along with the value $TS_{Vi}$ that was extracted from the video segment, to calculate a time budget using Equations 1 and 2, or equivalently Equation 3. (Note that value of the initial client buffer and other values may be determined by the transcoder as described above.)

At step 418, the transcoder calculates an estimated time to complete the transcode task (as described earlier); at step 420 it compares the time budget with the estimated time. If the budget is sufficient, then the transcode task is completed per the instructions (step 422). If not, then the transcode task is modified (424). As mentioned, the modification can involve creating fewer than all requested versions. The versions that can be dropped may be specified in the content provider configuration.

At step 426, the transcoding task is completed and the transcoder sends the resulting video segments to the destination specified in the task instructions or as specified in a system-wide configuration (e.g., back to the task controller as part of a callback function, or to a location in a network storage and/or content delivery network, using a naming convention).

In a variant of step 416, the transcoder can use Equation 4 to calculate the time budget.

Figure 4B:
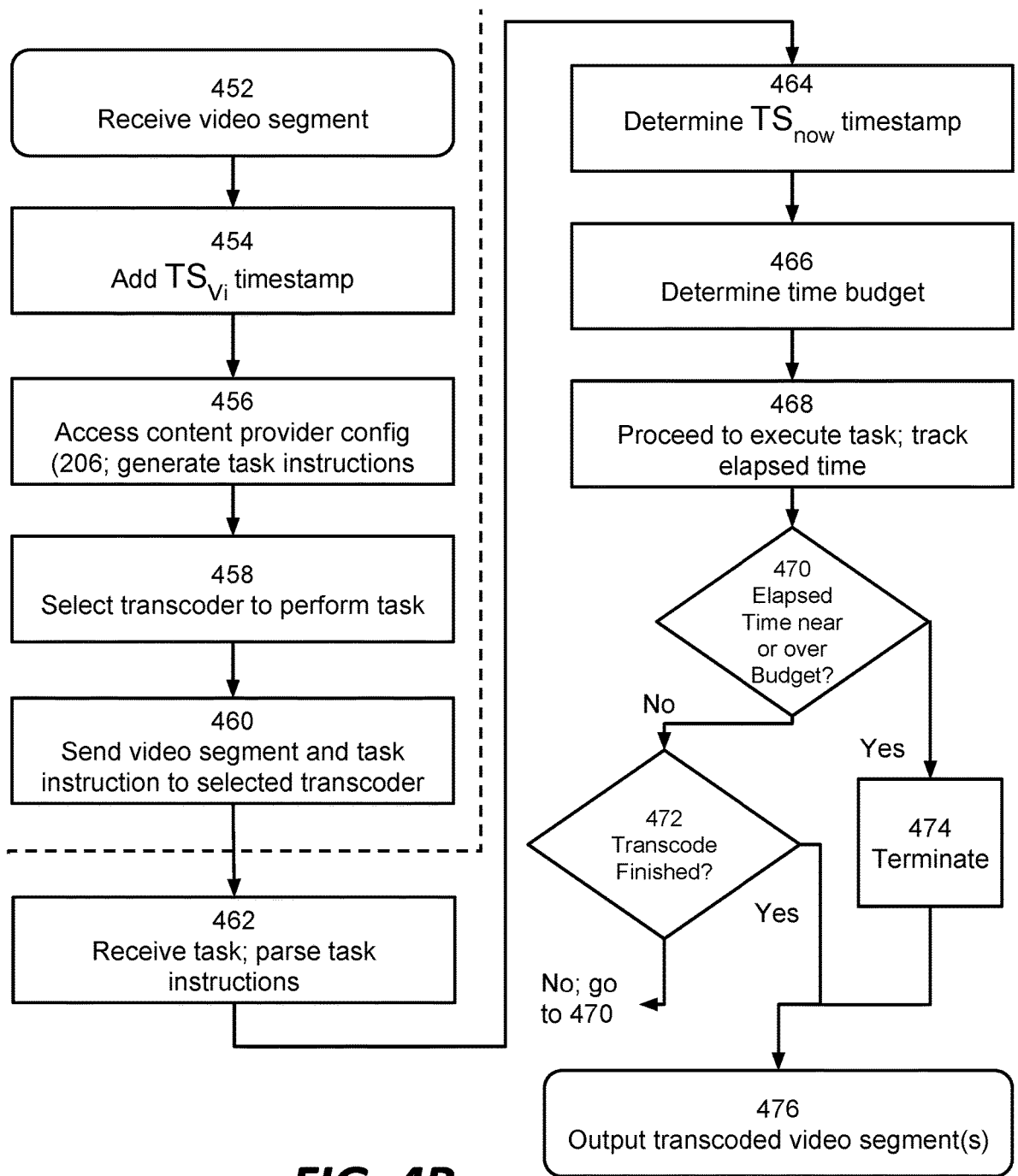
FIG. 4B is a flow diagram illustrating processing steps performed by the transcoding system shown in FIG. 1, according to an embodiment.

FIG. 4B is a logical flow diagram for calculating a time budget for a transcoder to complete a transcoding task, in another embodiment. The steps in FIG. 4B are the same as those in FIG. 4A, except that in step 468, the transcoder does not make an estimate of its own transcode time, as occurred in step 418 of FIG. 4A. Instead, the transcoder proceeds to process the video segment, while tracking the overall time (see steps 470, 472). If the time nears the budget, within some configurable threshold (e.g., within a few hundred milliseconds, or however long it will take the transcoder to react), then the transcoder terminates the task and simply does not generate the rest of the versions. (See step 474). Preferably, then, the versions are created in a priority order such that the most desired versions are produced first.

In one embodiment, to monitor the time without interrupting an in-progress version creation, the transcoder can check the elapsed time after each version is created. If the elapsed time is over or within some configurable threshold of the budget, then the task is terminated. This alternative is not illustrated in FIG. 4B, but would entail checking elapsed time 470 after each version, and then proceeding to the next version at 472 ("No") or terminating at 474 ("Yes").

A variant of step 466 in FIG. 4B involves the transcoder using Equation 4 to calculate the time budget, rather than Equation 3, or Equations 1 and 2.

Figure 4C:
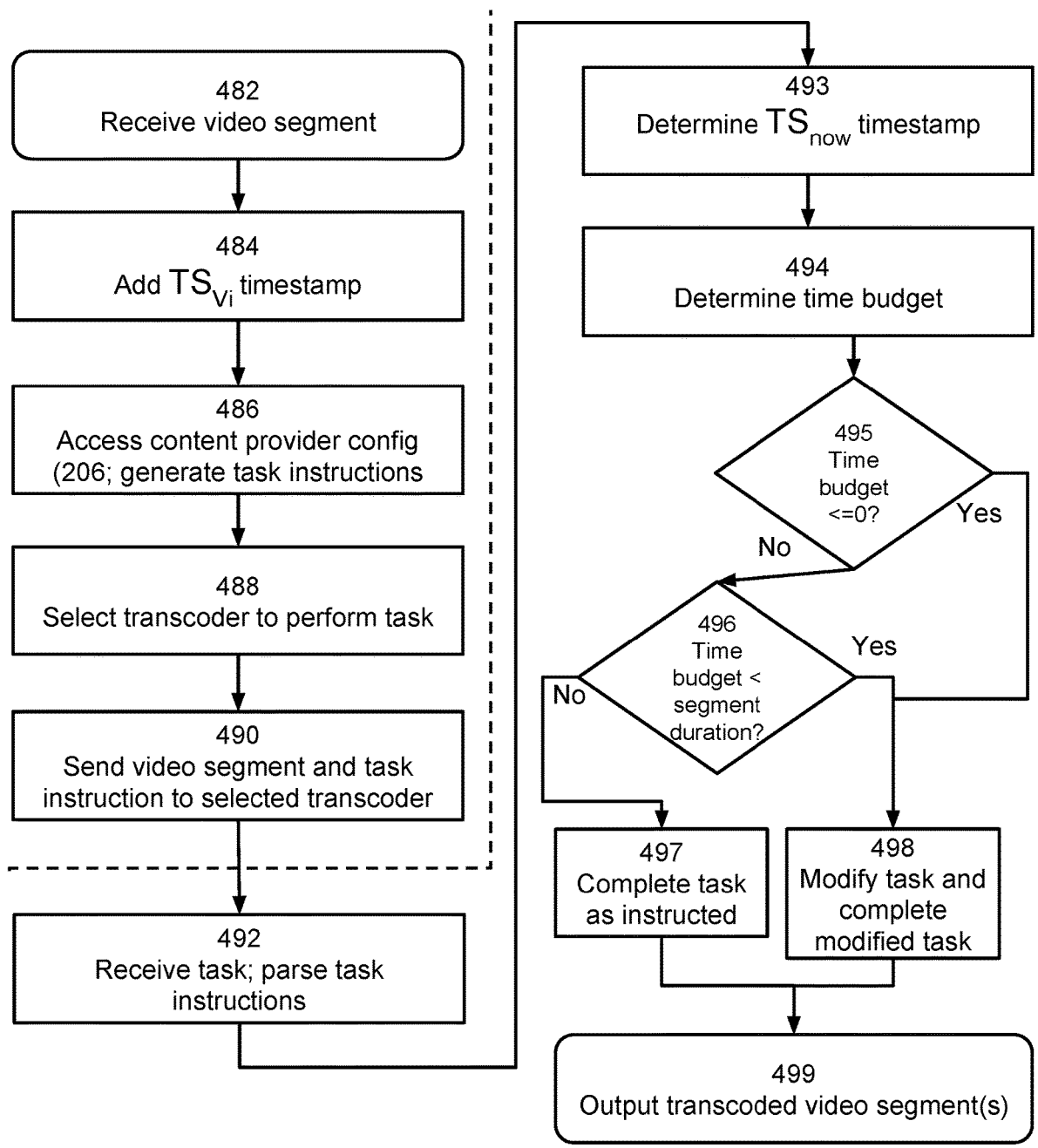
FIG. 4C is a flow diagram illustrating processing steps performed by the transcoding system shown in FIG. 1, according to an embodiment; and, FIG. 5 is a block diagram illustrating hardware in a computer system that may be used to implement the teachings hereof.

FIG. 4C illustrates yet another embodiment. The processing steps track those in FIG. 4A, except that after the transcoder calculates the time budget in 494, the transcoder determines what to do based on a comparison between the calculated time budget and the playout duration of the video segment that it is transcoding.

Mezzanine Fallback

Mezzanine fallback is a technique to avoid the complete absence of a media file for clients when the transcode task fails to produce any versions. That may occur because of the time budget restriction (in a worst case scenario) or due to a system fault.

Mezzanine fallback involves having a copy of the mezzanine file (i.e., the original, unmodified video file sent from the video generation system 100 to the transcoding system 110) be uploaded directly to the output location (i.e., the network storage 130 and/or CDN 120 in FIG. 2). The video generation system or more preferably the ingest component of the transcode system 110 can perform this function. Preferably this occurs in parallel with the task controller 200 sending the mezzanine's segments to transcoding resources 202 for version creation.

The mezzanine file is also added to the stream manifest as an alternate choice for the client player. As those skilled in the art will know, a stream manifest, playlist, or equivalent is used in modern adaptive bitrate streaming to inform the client of the available stream variants in an established textual format; the generation and use of manifests is well known in the art.

The result of mezzanine fallback is that the client player will at least have the original mezzanine file to use for streaming, although it will usually require a high bandwidth to the client. Preferably, the mezzanine file is in a format that the client player expects from the playlist (e.g., container/codec) or a compatible format. (For example segmented TS video or fragment MP4 for an HLS/DASH output playlist, etc.)

Computer Based Implementation

The teachings hereof may be implemented with conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
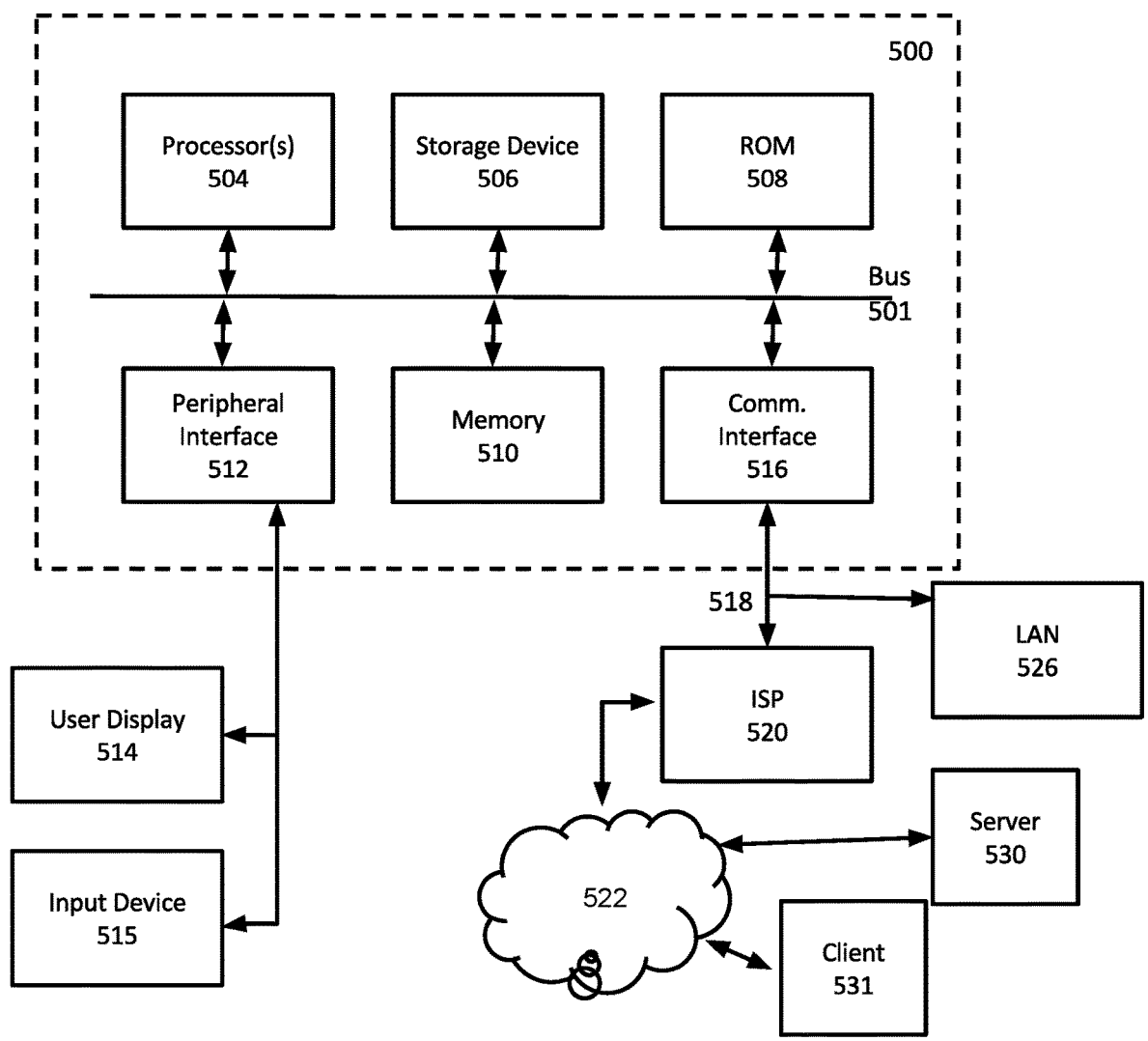

FIG. 5 is a block diagram that illustrates hardware in a computer system 500 upon which such software may run in order to implement embodiments of the invention. The computer system 500 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 500 includes a microprocessor 504 coupled to bus 501. In some systems, multiple processor and/or processor cores may be employed. Computer system 500 further includes a main memory 510, such as a random access memory (RAM) or other storage device, coupled to the bus 501 for storing information and instructions to be executed by processor 504. A read only memory (ROM) 508 is coupled to the bus 501 for storing information and instructions for processor 504. A non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

A peripheral interface 512 communicatively couples computer system 500 to a user display 514 that displays the output of software executing on the computer system, and an input device 515 (e.g., a keyboard, mouse, trackpad, touchscreen) that communicates user input and instructions to the computer system 500. The peripheral interface 512 may include interface circuitry, control and/or level-shifting logic for local buses such as RS-485, Universal Serial Bus (USB), IEEE 1394, or other communication links.

Computer system 500 is coupled to a communication interface 516 that provides a link (e.g., at a physical layer, data link layer), between the system bus 501 and an external communication link. The communication interface 516 provides a network link 518. The communication interface 516 may represent a Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the processor executing code. Such code may be read from or stored on a non-transitory computer-readable medium, such as memory 510, ROM 08, or storage device 06. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 18 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A system for determining a time budget for transcoding a video segment, comprising:
one or more computers having circuitry forming at least one processor and memory storing instructions to be executed on the at least one processor, the instructions including instructions for, with the one or more computers, adding a first timestamp to a video segment upon receipt of the video segment from a video generation system, and sending the video segment with the first timestamp to a transcoder;
the transcoder having circuitry forming at least one processor and memory storing instructions to be executed on the at least one processor, the instructions including instructions for, with the transcoder:
receiving a transcoding task with instructions for transcoding the video segment;
receiving the video segment with the first timestamp;
determining a second timestamp for the video segment, the second timestamp being a current time at which the transcoder begins transcoding the video segment;
determining a time budget for performing the transcoding task based at least in part on the result of: subtracting, from a CBinitial value, the difference between the second timestamp and the first timestamp, where the CBinitial value is a value representing the size of an initial video buffer kept in one or more client player applications during video playback;
based at least in part on the time budget, the transcoder taking a configured action that affects the amount of time the transcoder takes to perform the transcoding task for the video segment.

2. The system of claim 1, wherein the video segment is a portion of a live video.

3. The system of claim 1, wherein the configured action comprises one or more of: omit a version, change priority level for executing the task on the transcoder, omit all versions in the transcoding task.

4. The system of claim 1, wherein the transcoding task comprises any of: (1) creating one or more new versions of the video segment and (2) changing a characteristic of the video segment.

5. The system of claim 4, wherein the characteristic is any of container format, elementary stream format, codec, compression level, frame rate, bitrate, resolution, aspect ratio.

6. The system of claim 1, wherein the size of the CBinitial value is specific to an initial buffer size of a particular client player application.

7. The system of claim 1, wherein the size of the CBinitial value is configured to be a function of at least one of: video segment container type and target video segment duration.

8. The system of claim 1, the instructions of the transcoder further comprising instructions for, based at least in part on the time budget, the transcoder taking a configured action that reduces the time the transcoder takes to perform the transcoding task for the video segment to be equal to or less than the time budget.

9. The system of claim 1, where the CBinitial value is a predetermined value.

10. The system of claim 1, the instructions of the transcoder further comprising instructions for determining a time budget for performing the transcoding task based at least in part on the result of:

i) subtracting, from the CBinitial value, the difference between the second timestamp and the first timestamp, where the CBinitial value is a value representing the size of an initial video buffer kept in one or more client player applications during video playback; and,
(ii) subtracting, from the result calculated in (i), an estimate of time necessary to any of deliver and decode an initial frame of the video segment.

11. The system of claim 10, wherein the estimate is expressed as a function of the duration of the video segment ($\lambda T_n$).

12. The system of claim 10, wherein the one or more computer's memory includes instructions for sending a copy of the video segment to any of a content delivery network and a network storage system, in addition to and at the time of sending the video segment to the transcoder.

13. A method performed by a computer having circuitry forming at least one processor and memory holding instructions for execution by the at least one processor to perform the method, the method comprising:
receiving a transcoding task with instruction for transcoding a video segment;
receiving the video segment and a first timestamp;
determining a second timestamp for the video segment, the second timestamp being the time at which the computer begins transcoding the video segment;
determining a time budget for performing the transcoding task, based at least in part on the result of a calculation comprising: subtracting, from a CBinitial value, the difference between the second timestamp and the first timestamp, where the CBinitial value is a value representing the size of an initial buffer for video stored by one or more client player applications during video playback;
based at least in part on the time budget, taking a configured action that affects the time the computer takes to perform the transcoding task for the video segment.

14. The method of claim 13, wherein the first timestamp was added to the video segment by any of: an ingest machine and a video generation system.

15. The method of claim 13, wherein the video segment is a portion of a live video.

16. The method of claim 13, wherein the configured action comprises one or more of: omit a version, change priority level for executing the task on the computer, omit all versions in the transcoding task.

17. The method of claim 13, wherein the transcoding task comprises any of: (1) creating one or more new versions of the video segment and (2) changing a characteristic of the video segment.

18. The method of claim 17, wherein the characteristic is any of container format, elementary stream format, codec, compression level, frame rate, bitrate, resolution, aspect ratio.

19. The method of claim 13, wherein the size of the CBinitial value is specific to an initial buffer size of a particular client player application.

20. The method of claim 13, further comprising, selecting the size of the CBinitial value based at least in part on: the container type of the video segment and the target video segment duration.

21. The method of claim 13, further comprising, based at least in part on the time budget, taking a configured action that reduces the time the computer takes to perform the transcoding task for the video segment to be equal to or less than the time budget.

22. The method of claim 13, where the CBinitial value is a predetermined value.

23. The method of claim 13, comprising, determining a time budget for performing the transcoding task based at least in part on the result of:
   i) subtracting, from the CBinitial value, the difference between the second timestamp and the first timestamp, where the CBinitial value is a value representing the size of an initial video buffer kept in one or more client player applications during video playback; and,
   (ii) subtracting, from the result calculated in (i), an estimate of time necessary to any of deliver and decode an initial frame of the video segment.

24. The method of claim 23, wherein the estimate is expressed as a function of the duration of the video segment ($\lambda T_{Vi}$).

* * * * *